Feb. 26, 1952     C. E. MITCHELL     2,587,194
AUXILIARY SEAT FOR VEHICLES AND THE LIKE
Filed Sept. 1, 1950
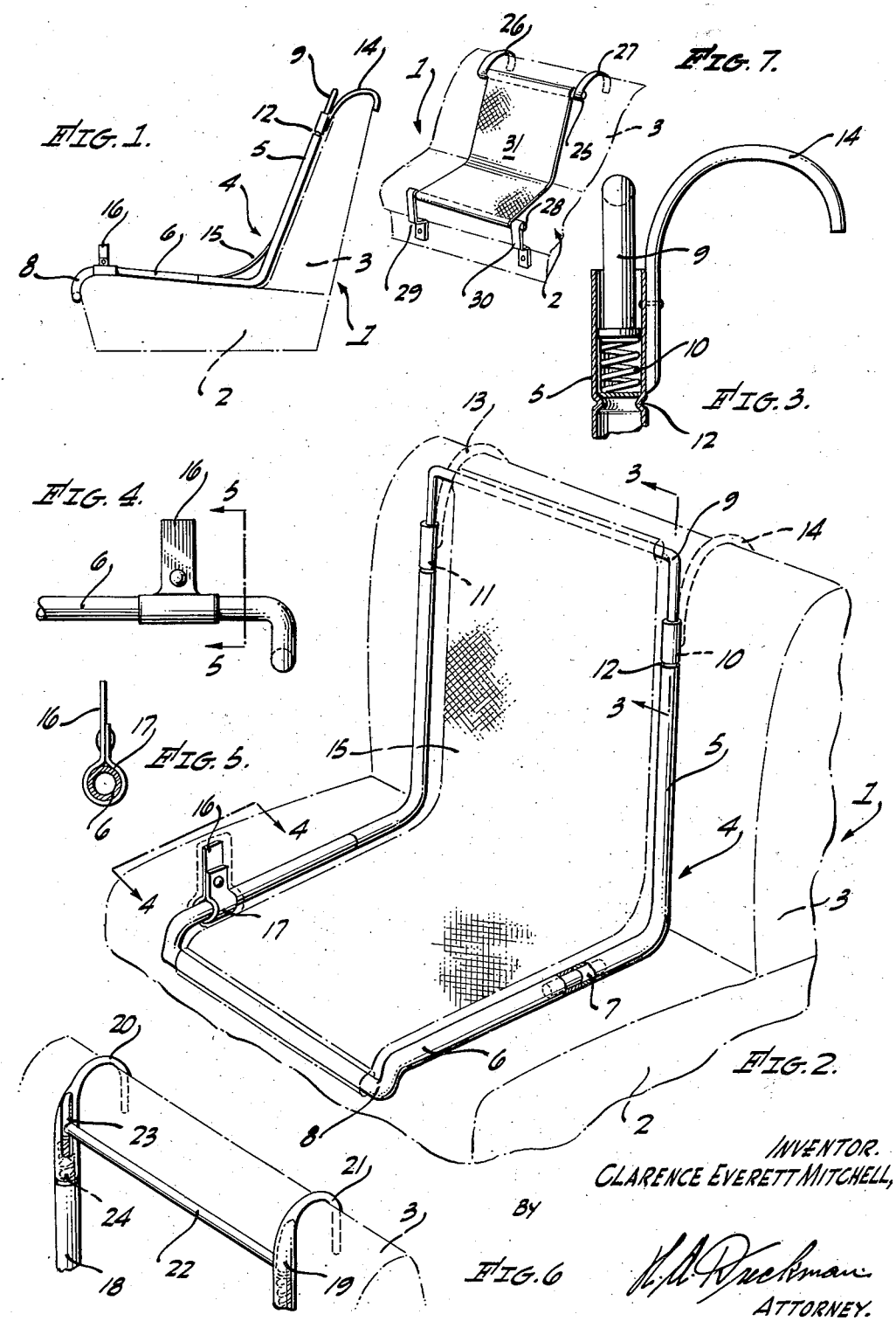
INVENTOR.
CLARENCE EVERETT MITCHELL,
BY
ATTORNEY.

Patented Feb. 26, 1952

2,587,194

UNITED STATES PATENT OFFICE 2,587,194

AUXILIARY SEAT FOR VEHICLES AND THE LIKE

Clarence Everett Mitchell, Garden Grove, Calif.

Application September 1, 1950, Serial No. 182,840

7 Claims. (Cl. 155—182)

1

This invention relates to an auxiliary or supplemental seat which is placed on the cushion or seat of a vehicle, and the prime purpose of my invention is to provide a novel auxiliary seat which will prevent chafing or binding of the person sitting thereon.

Another object of my invention is to provide a novel auxiliary seat of the character stated, in which there is no relative movement between the back portion and the seat portion of the seat when occupied, and when there is the usual amount of vibration or other movement of the vehicle.

A feature of my invention is to provide a novel auxiliary seat of the character stated, in which the cloth covering of the auxiliary seat moves together as a unit as the person moves up and down on the springs of the seat of the vehicle.

A feature of my invention is to materially reduce the strain on the occupant of my auxiliary seat due to the normal movement of the occupant in the vehicle.

Other objects, advantages and features of invention may appear from the accompanying drawing, the subjoined detailed description and the appended claims.

In the drawing:

Figure 1 is a side elevation of my auxiliary seat in position on the seat of a vehicle.

Figure 2 is a perspective view of the same.

Figure 3 is an enlarged fragmentary sectional view taken on line 3—3 of Figure 2.

Figure 4 is a fragmentary side elevation as viewed from the line 4—4 of Figure 2.

Figure 5 is a sectional view taken on the line 5—5 of Figure 4.

Figure 6 is a perspective view of a slightly modified form of seat frame.

Figure 7 is a perspective view of still another modified form of seat frame.

Referring more particularly to the drawing, the usual vehicle seat 1 includes a seat portion 2 and and a back portion 3, these vehicle seats are provided with coil springs, all of which is usual and well known, and consequently, the occupant of the seat will move vertically and perhaps horizontally at times due to road shock and other conditions under which the vehicle is placed. When the person is sitting in the vehicle seat, it is normal for the seat portion 2 to move independently of the back portion 3, consequently, there is a constant chafing, rubbing, or binding on the person occupying this seat.

My auxiliary seat 4 consists of a frame, which includes a back portion 5, and a horizontal or seat portion 6. The auxiliary frame is tubular pref-

2 erably, and may be provided with a slip joint 7, on each side, which can be separated for storing purpose.

The seat portion 6 of the frame is preferably bent downwardly, as shown at 8, over the edge of the seat 2, thus positioning the auxiliary seat or the frame thereof correctly in the vehicle seat 1.

The vertical portion of the frame 5 is open at the top to receive a head member 9, which is formed as an inverted U. The head member 9 projects into the top of the vertical portions 5 of the frame 4 and rests against coil spring 10—11, in the upper ends of the tubular members 5. The springs 10—11 are held in proper position relative to downward movement in the tubular members 5 by a constricted neck portion 12, which is formed in each of the tubular members. When a load is placed on the head portion 9, the springs 10—11 will be compressed and, furthermore, these springs will assist in positioning the fabric seat cover, as will be further described.

To assist in properly positioning the auxiliary seat on the vehicle seat, I may provide a pair of hooks 13—14. These hooks may be fixedly secured to the upper ends of the vertical frame members 5, and they hook over the top of the back 3, substantially as shown.

My auxiliary seat will function without the hooks 13—14, however, with the hooks, the seat will be more securely held in its proper relative position on the vehicle seat.

A fabric seat cover 15 is attached at the upper end to the head piece 9 and at the lower end to the cross piece 8, but neither side of the seat cover is attached to the members 5 or 6, that is, the seat cover is secured only at its upper and lower ends and the sides are free to move in any direction. Consequently, when the auxiliary seat is occupied, the back and the seat portion of the cover 15 will move together or as a unit, and as a result there is no chafing or binding on the occupant.

A leg supporting clip 16 is secured to one of the horizontal frame members 6, and can be adjusted on this frame member since this clip is formed with a clamp 17. The clip 16 may be covered with a boot of foam rubber, if desired.

In Figure 6 I have shown a slightly modified form of frame in which the auxiliary seat side members 18—19 are bent at their upper ends to form the hooks 20—21, respectively.

A head bar or cross bar 22 extends through a slot 23 in each of the vertical members and rests on a spring 24 positioned within the vertical members in the same manner as the spring 10, previously described. The fabric seat cover is attached at one end to the cross bar 22, in the same manner as it is attached to the head piece 9, previously described.

In Figure 7 I have shown another type of frame, which consists of a cross bar 25, to either end of which there is secured a spring hook 26—27. These spring hooks extend over the top of the seat back, as shown. A second bar 28 is mounted on the brackets 29—30, and these brackets are attached to the frame of the seat portion 2 of the vehicle seat. The fabric cover 31 is secured at its upper end to the rod 25, and at its lower end to the rod 28, thus being suspended in the same manner as the seat cover 15, previously described, namely, it is attached at its upper and lower ends only and both sides are free to move in any direction.

The spring 19 serves to take up tension in the fabric seat cover 15 and these springs have sufficient tension to create a firmness in the seat cover so that at least a portion of the road shock is taken up in these springs, and also the seat cover 15 is held taut at all times.

Having described my invention, I claim:

1. An auxiliary seat for vehicles, and the like, comprising a frame, including a horizontal head member, a horizontal seat member, both of said members extending transversely of the auxiliary seat, a fabric cover attached at the upper end to the transverse head member, and at the lower end to the seat member, and means in said frame resiliently supporting the upper transverse head member.

2. An auxiliary seat for vehicles, and the like, comprising a tubular frame member, including a transverse head member, a spring mounted in said tubular frame adjacent the upper end thereof, a transverse head member supported on said springs, said frame including a second transverse member at the lower end thereof, a fabric cover, said cover being secured at the upper end to said head member, and at the lower end to said second named transverse member, both sides of said fabric cover being free of the frame.

3. An auxiliary seat for vehicles, and the like, comprising a tubular frame member, including a transverse head member, a spring mounted in said tubular frame adjacent the upper end thereof, a transverse head member supported on said springs, said frame including a second transverse member at the lower end thereof, a fabric cover, said cover being secured at the upper end to said head member, and at the lower end to said second named transverse member, both sides of said fabric cover being free of the frame, and a hook on the upper ends of the frame members, said hooks extending over the back of the vehicle seat.

4. An auxiliary seat for vehicles, and the like, comprising a tubular frame member, including a transverse head member, a spring mounted in said tubular frame adjacent the upper end thereof, a transverse head member supported on said springs, said frame including a second transverse member at the lower end thereof, a fabric cover, said cover being secured at the upper end to said head member, and at the lower end to said second named transverse member, both sides of said fabric cover being free of the frame, and a leg clip mounted on one side of said frame and projecting upwardly therethrough.

5. An auxiliary seat for vehicles, and the like, comprising a tubular frame member extending across the seat portion and upwardly along the back portion of the vehicle seat, a lower transverse member on the frame, said frame being bent downwardly to extend over the edge of the seat of the vehicle, a spring mounted in the upper ends of the vertical portions of the frame, a transverse head member resting on said springs, and a fabric cover attached at the upper end to the transverse head member, and at the lower end to the first named transverse member, both sides of the fabric cover being free of said frame.

6. An auxiliary seat for vehicles, and the like, comprising a tubular frame member extending across the seat portion and upwardly along the back portion of the vehicle seat, a lower transverse member on the frame, said frame being bent downwardly to extend over the edge of the seat of the vehicle, a spring mounted in the upper ends of the vertical portions of the frame, a transverse head member resting on said springs, and a fabric cover attached at the upper end to the transverse head member, and at the lower end to the first named transverse member, both sides of the fabric cover being free of said frame, and a hook on the upper ends of said frame, said hooks extending over the top of the vehicle seat back.

7. An auxiliary seat for vehicles, and the like, comprising a tubular frame member extending across the seat portion and upwardly along the back portion of the vehicle seat, a lower transverse member on the frame, said frame being bent downwardly to extend over the edge of the seat of the vehicle, a spring mounted in the upper ends of the vertical portions of the frame, a transverse head member resting on said springs, and a fabric cover attached at the upper end to the transverse head member, and at the lower end to the first named transverse member, both sides of the fabric cover being free of said frame, and a hook on the upper ends of said frame, said hooks extending over the top of the vehicle seat back, and a leg clip mounted on said side of said frame and projecting upwardly therefrom.

CLARENCE EVERETT MITCHELL.

REFERENCES CITED

The following references are of record in the file of this patent:

UNITED STATES PATENTS

| Number | Name | Date |
| --- | --- | --- |
| 2,534,581 | Eeman | Dec. 19, 1950 |